United States Patent
Chen et al.

(10) Patent No.: US 7,477,631 B2
(45) Date of Patent: Jan. 13, 2009

(54) METHOD OF CONTROLLING SIGNAL TRANSMISSION IN A LOCAL AREA NETWORK

(75) Inventors: Ming-Chun Chen, Chi-Lung (TW); Wuo-Hui Chu, Taipei (TW); Tsung-Hsien Chen, Tai-Nan (TW)

(73) Assignees: Qisda Corporation, Taoyuan County (TW); BenQ Corporation, Taipei (TW)

( * ) Notice: Subject to any disclaimer, the term of this patent is extended or adjusted under 35 U.S.C. 154(b) by 710 days.

(21) Appl. No.: 10/904,292

(22) Filed: Nov. 3, 2004

(65) Prior Publication Data

US 2005/0094557 A1  May 5, 2005

(30) Foreign Application Priority Data

Nov. 4, 2003  (TW) .............................. 92130783 A

(51) Int. Cl.
*H04L 12/26* (2006.01)
(52) U.S. Cl. ...................... 370/338; 370/229
(58) Field of Classification Search ................ 370/229, 370/342, 352
See application file for complete search history.

(56) References Cited

U.S. PATENT DOCUMENTS

| | | | | |
|---|---|---|---|---|
| 6,438,594 | B1 * | 8/2002 | Bowman-Amuah | 709/225 |
| 2003/0152060 | A1 * | 8/2003 | Danneel et al. | 370/342 |
| 2005/0063391 | A1 * | 3/2005 | Pedersen | 370/395.21 |

* cited by examiner

*Primary Examiner*—Sam Bhattacharya

(57) ABSTRACT

A method for transmitting data in real time in a multimedia data stream over a local network is provided. The local network comprises a sending end and one or more receiving ends. The method includes the steps of packaging a QoS (quality of service) control signal into a QoS packet according to a RTCP/TCP/IP protocol; packaging the multimedia data stream into a multimedia data packet according to a RTP/UDP/IP protocol; establishing a connection between the sending end and one of the one or more receiving ends; delivering the QoS packet and the multimedia data packet from the sending end to the one or more receiving end over the local network; and the one or more receiving end de-packaging the QoS packet into the QoS signal to control the transmission of the multimedia data stream.

11 Claims, 4 Drawing Sheets

METHOD OF CONTROLLING SIGNAL TRANSMISSION IN A LOCAL AREA NETWORK

BACKGROUND OF INVENTION

1. Field of the Invention

The present invention relates to a method of controlling a transmission over a local area network, and more specifically, to a method of using an RTCP/TCP/IP protocol to transmit QoS packets during multimedia data transmission.

2. Description of the Prior Art

With the rapid development of computer technology, costs are reduced and functions improved; as a result, many families now own two more computers. Through a simple local area network established by two computers at home, a user at home is able to share a printer or an optical drive, play on-line games, and even share programs. For example, some programs can be installed in one computer that has more storage capacity or higher speed CPU, and can be shared by the other one via the local area network, instead of being installed on both computers. Therefore, a family only has to own a single large-capacity computer for storing multimedia files of several gigabytes, and share such files through the local area network.

Please refer to FIG. 1, showing a schematic diagram of a conventional local area network 10. The local area network 10 comprises a plurality of hosts, one as sending end 12, and the others as receiving ends 14.

Suppose that an on-line video home meeting is held via the local area network 10. Generally speaking, because a higher transmission quality is required when real-time audio and video data packets are transmitted between the sending end 12 and the receiving ends 14, an RTP/UDP/IP protocol is used to send audio and video data packets. The UDP/IP protocol is a simple but unreliable data packet transmission protocol; "unreliable" in the sense that the data packets from the sending end 12 are not guaranteed to either reach the receiving end 14 or arrive in a correct sequence. Fortunately, for a small local area network, the arrival ratio of the data packets using the UDP/IP protocol is close to 100%. Therefore, the UDP/IP protocol, which has shorter packets than TCP/IP protocol packets due to less and simpler parameter settings, is commonly used in multimedia data transmission. Additionally, the sending end 12 can multicast data packets to given ports of the receiving ends 14 on the identical local network 10. Furthermore, a Real-Time Transport Protocol (RTP) in cooperation with UDP/IP is used for packaging the audio and video data. An RTP header within the audio and video data packets provides essential timing information and an order number so that the receiving end 14 recognizes whether a data packet is lost or that the data packets have arrived in order during transmission so that the receiving ends 14 (i.e. all the meeting participants) can exactly recombine the received packets and estimate the number of lost packets. Therefore, the RTP header further contains some information for a data-compression protocol, such as PCM and ADPCM. In this way, if a huge amount of video and audio is transmitted in the data stream, RTP/UDP/IP is usually used for transmitting the data stream. The basic principle of RTP, defined in RFC 1889, is well known in the art.

Before sending data packets, the sending end 12 has to get a multicast address and two ports, one for RTP packets (video packet) and the other one for RTCP (RTP control protocol) packets, i.e. Quality of Service (QoS) control packets. The purpose of transmitting QoS packets is to ensure the transmission quality will not be limited by bandwidth, delay, jitter, and packet loss. Generally speaking, the sending end 12 and the receiving end 14 send QoS packets using RTCP/UDP/IP there and between in a regular period. In addition, RTCP is used for synchronization of audio and video packets.

However, generally speaking, no router or only one or two routers are arranged in the conventional home local area network 10 for peer-to-peer data transmission. Under the UDP/IP circumstance, such parameters as "jitter" and "round-trip-time" within the RTCP header of the QoS packet are useless, where "jitter" indicates an arrived time difference between each packet, and "round-trip-time" indicates a back and forth interval of each packet. That is because although each router can analyze the UDP/IP header within the QoS packet to maintain the data flow control among the routers, few routers are present in the conventional home local area network 10, meaning that the QoS packet will pass through one or two routers or no router at all.

As mentioned above, using UDP/IP to transmit the packets is not guaranteed to arrive at the destination or arrive in a correct order. When several users simultaneously share the bandwidth of the local network 10, the transmitted packets will probably be lost or delayed due to network congestion. In addition, for UDP/IP, packets that do not arrive at their destination are not resent so that the loss of a transmitted QoS packet using UDP/IP is possible. Even if the QoS packet arrives at its destination, "jitter" and "round-trip-time" parameters are still ineffective because the QoS packet using UDP/IP does not pass through only one or two routers or no router at all, resulting in invalid "jitter" and "round-trip-time" parameters. Also, as well, a local network 10 using UDP/IP fails to adjust the audio and video packets of transmission quality between the sending end 12 and any receiving end 14, resulting in bad playing quality of the audio and video packets.

SUMMARY OF INVENTION

It is therefore a primary objective of the claimed invention to provide a method for transmitting data in real time in a multimedia data stream over a local network, of which the QoS packet having delay control parameters within RTCP header is packaged by using RTCP/TCP/IP so as to control the data flow properly, to solve the aforementioned problem.

According to the claimed invention, a method for transmitting data over a local network is disclosed. The data comprises a quality of service (QoS) control signal and a multimedia data stream. The local network comprises a sending end and at least one receiving end. And the method comprises the steps of packaging the QoS (quality of service) control signal into a QoS packet according to an RTCP/TCP/IP protocol; packaging the multimedia data stream into a multimedia data packet according to an RTP/UDP/IP protocol; establishing a connection between the sending end and the at least one receiving end; delivering the QoS packet and the multimedia data packet from the sending end to the at least one receiving end over the local network; and the at least one receiving end de-packaging the QoS packet into the QoS signal to control the transmission of the multimedia data stream.

These and other objects and the advantages of the present invention will no doubt become obvious to those of ordinary skill in the art after having read the following detailed description of the preferred embodiment, as illustrated by the included figures and drawings.

DETAILED DESCRIPTION

Figure 1:
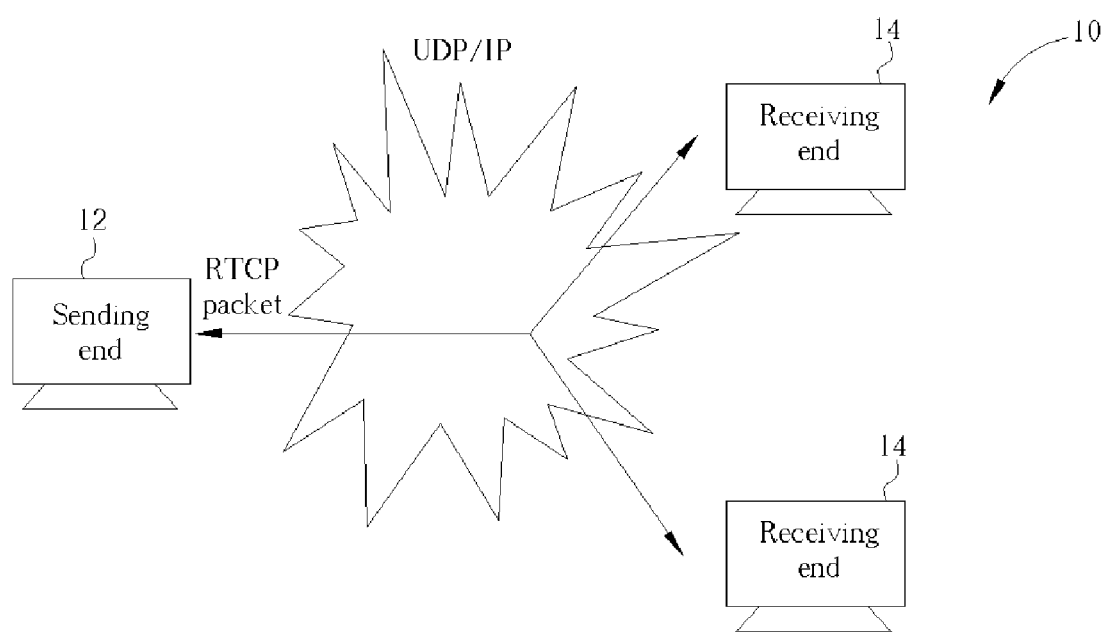
FIG. 1 shows a schematic diagram of a conventional local area network.
Figure 2:
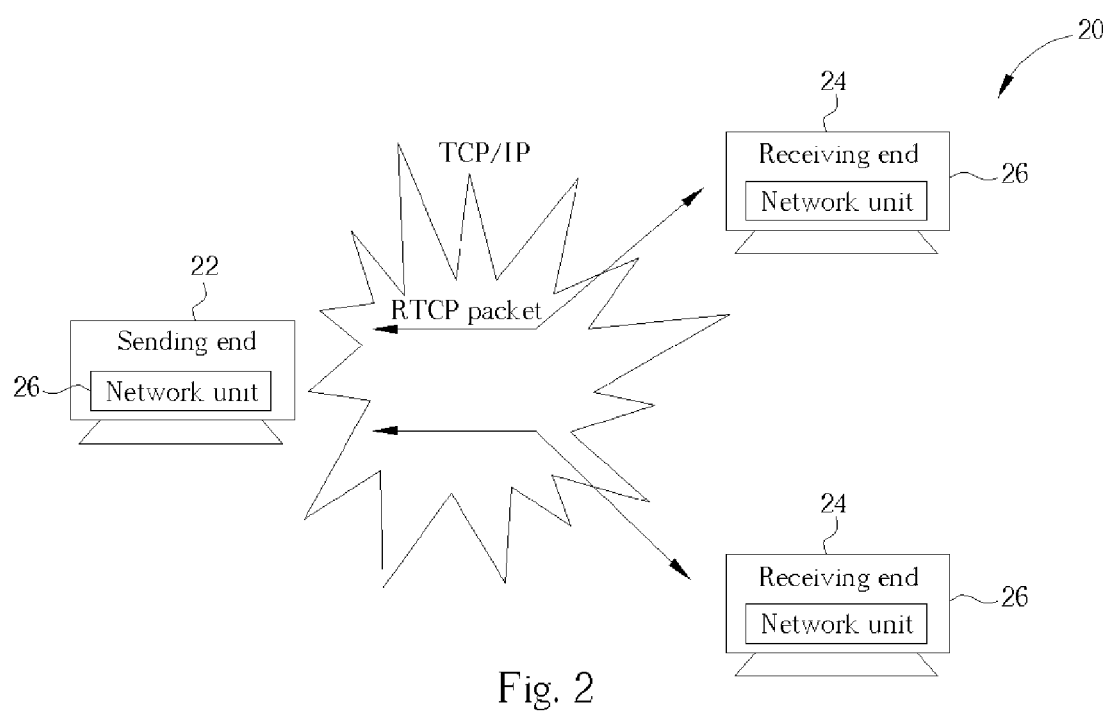
FIG. 2 is a schematic diagram of the local area network using the present invention method.

Please refer to FIG. 2, which is a schematic diagram of the local area network using the present invention method. The local area network comprises a plurality of hosts, one host as sending end 22, the others as receiving ends 24. Each host comprises a network unit 26. In fact, any host used for sending data in the local area network can serve as a sending end 22, and the other hosts used for receiving data can serve as receiving end 24. The local area network can be a wireless network.

Figure 3:
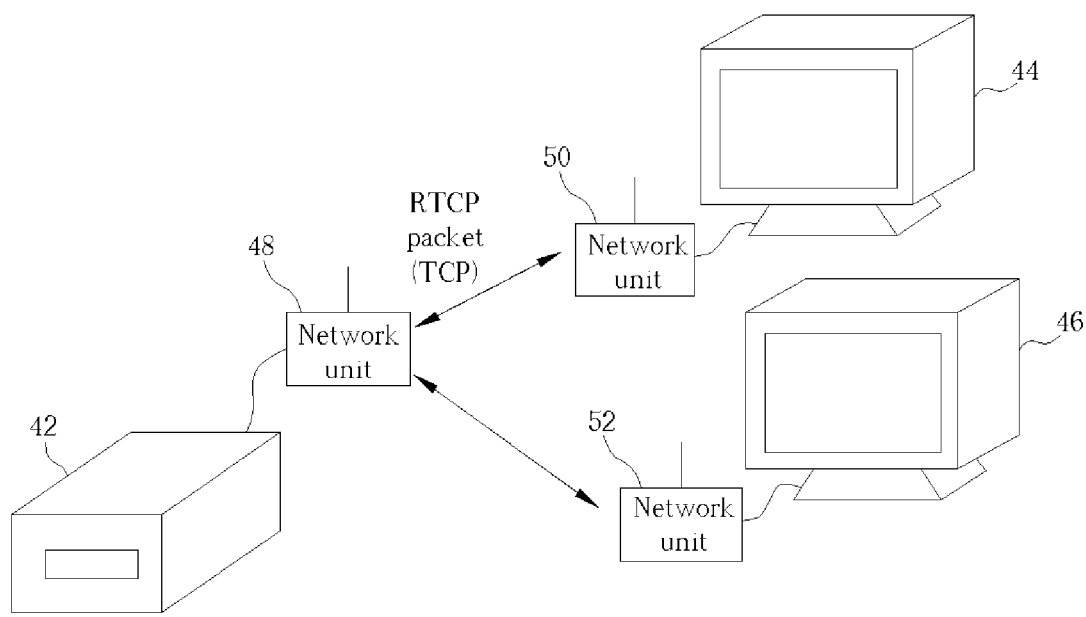
FIG. 3 is a diagram of another embodiment according to the present invention.

Please refer to FIG. 3, which is a diagram of another embodiment according to the present invention. A network unit 48 connected with a multimedia player 42, which can be a DVD player or an image server and serving as a sending end, transmits data to network units 50, 52, serving as receiving end. Terminals 44, 46 such as televisions or computers are used for displaying the received multimedia data stream. In the course of multimedia data transmission between the network units 48, 50, 52, QoS packets delivered there and between and packaged by RTCP/TCP/IP are used to control data transmission flow through the characteristic of TCP/IP, meaning that the QoS packet is resent from the sending end at a regular period until it is received by the receiving end. In doing so, the QoS packet from the sending end is bound to reach the receiving end. Nevertheless, the multimedia data packets are still packaged by the UDP/IP protocol in the network unit 48, then transmitted and de-packaged by the network units 50, 52, and transmitted to the terminals 44, 46 for display.

Figure 4:
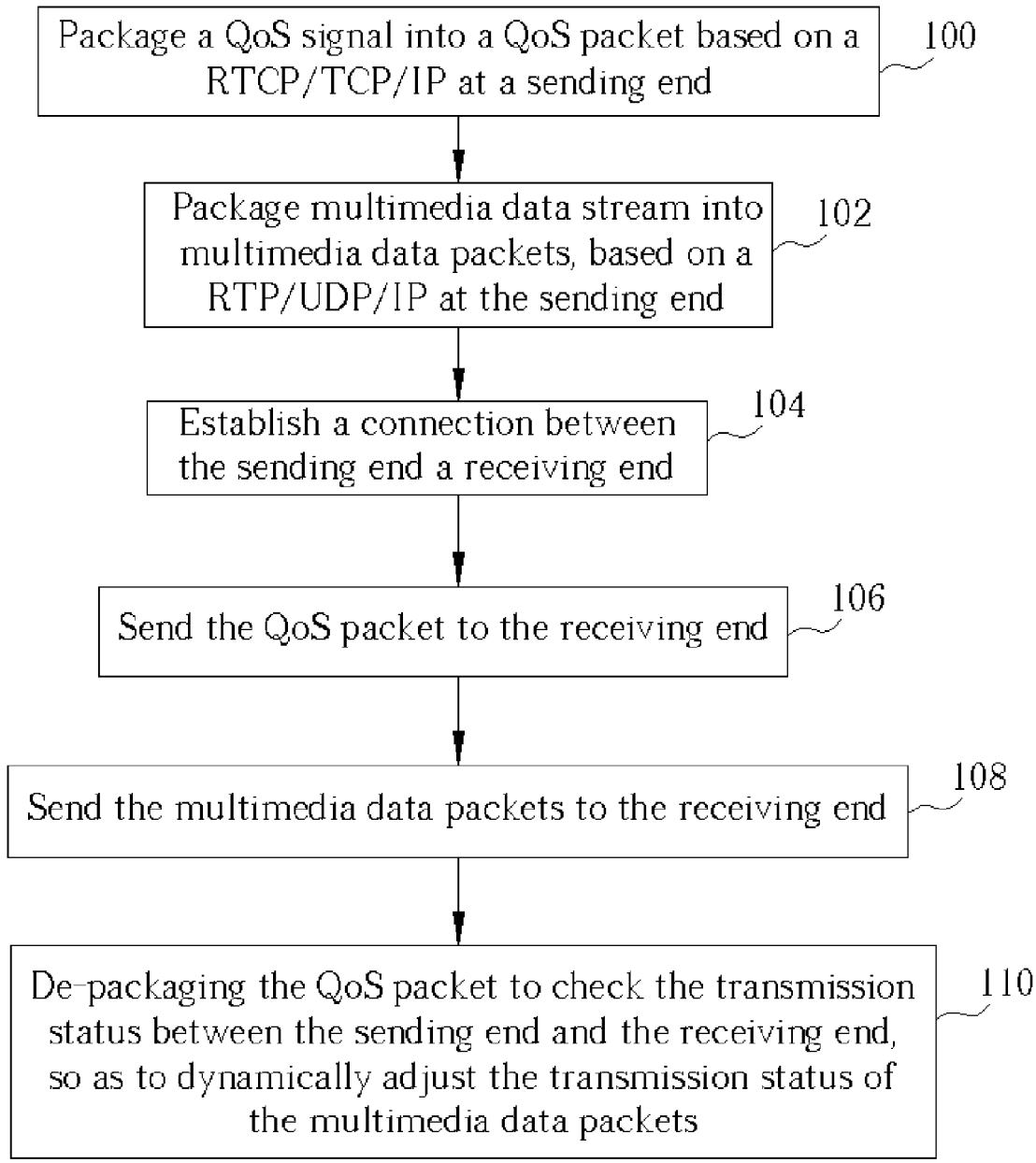
FIG. 4 illustrates a flowchart of the present invention of controlling a transmission within the local area network.

Please refer to FIG. 4 in conjunction with FIG. 2. FIG. 4 illustrates a flowchart of the present invention of controlling a transmission within the local area network. It occurs as follows:

Step 100: The network unit 26 of the sending end 22 packages the QoS signal into a QoS packet according to RTCP/TCP/IP protocol;

Step 102: The network unit 26 of the sending end 22 packages the multimedia data stream consisting of video and audio packets into multimedia data packets according to an RTP/UDP/IP protocol.

Step 104: Establish a connection between the sending end 22 and the receiving end 24.

Step 106: Send the QoS packet from the sending end 22 to each receiving end 24.

Step 108: Send the multimedia data packets from the sending end 22 to at least one receiving end 24.

Step 110: The network unit 26 of the receiving end 24 de-packages the QoS packet into a QoS signal to check the transmission status between the sending end 22 and the receiving end 24, so as to dynamically adjust the transmission status of the multimedia data packets in each connection.

The reason for using Transmission Control Protocol (TCP) to send the QoS packet instead of UDP is explained as follows. First of all, lets introduce the operation principle of TCP roughly. During TCP transmission, the sending end 22 and the receiving end 24 establishes a bidirectional error-detection connection. In order to ascertain the reliability of data packet transmission, TCP packets are bound to arrive the destination in a correct order; otherwise transmission failure occurs. This is because two specific bits, respectively named as SYN, ACK, are used within the TCP/IP packet header in the course of a new connection between the sending end 22 and the receiving end 24 being established. Before connection, the sending end 22 sends a packet to the receiving end 24, in which the SYN bit is set but the ACK bit is not set. The receiving end 24 responds with a packet in which both the ACK bit and the SYN bit are set while the packet with the set SYN bit is received. Finally, the sending end 22 sends a packet to the receiving end 24, in which the ACK bit is set but the SYN bit is not. By detecting whether the ACK bit is set or not, the sending end 22 recognizes which packets are used for establishing a new connection and which packets are in response to a connection being established. In other words, TCP/IP protocol is a kind of unicast transmission protocol, different from UDP/IP protocol, which serves as a multicast transmission protocol.

Under a congestion circumstance, the possibility of losing or delaying the QoS packets increases. However, the QoS packet transmitted by using TCP/IP protocol is bound to reach the receiving end 24, because lost packets will be resent until the sent packets are reached through the abovementioned check mechanism. Consequently, the problem of losing QoS packets using RTCP/UDP/IP is resolved. In addition, due to the QoS packet being bound to reach the receiving end, the transmission parameters within the RTCP header of the QoS packet, such as jitter and round-trip-time, are valid under the TCP/IP circumstance to show a delay variation between the sending end 22 and the receiving end 24. Hence, the sending end 22 can obtain information about transmission quality of the network 15 by analyzing these transmission parameters within the QoS packet, and dynamically adjust the transmission speed for the multimedia data stream to optimize the transmission quality in the local area network.

Notice that the network unit 26 is a wireless network card or a wireless access point.

In contrast to prior art, the present invention method utilizes a UDP/IP feature for multicasting data so that the real-time multimedia data stream is capable of being sent by using RTP/UDP/IP transmission protocol, and the QoS packet remains to be sent by using RTCP/TCP/IP transmission protocol. In this way, the reaching of the QoS packet to the receiving end is guaranteed, meaning that the parameters within the QoS packet for controlling the transmission condition is valid under TCP/IP circumstance.

Those skilled in the art will readily observe that numerous modifications and alterations of the method may be made while retaining the spirit and scope of the invention. Accordingly, the above disclosure should be construed as limited only by the metes and bounds of the appended claims.

What is claimed is:

1. A method for transmitting data over a local network, the data comprising a quality of service (QoS) control signal and a multimedia data stream, the local network comprising a sending end and at least one receiving end, and the method comprising:

packaging the QoS (quality of service) control signal into a QoS packet according to an RTCP/TCP/IP protocol;

packaging the multimedia data stream into a multimedia data packet according to an RTP/UDP/IP protocol;

establishing a connection between the sending end and the at least one receiving end;

delivering the QoS packet and the multimedia data packet from the sending end to the at least one receiving end over the local network; and the at least one receiving end de-packaging the QoS packet into the QoS signal to control the transmission of the multimedia data stream.

2. The method of claim 1, wherein the local area network is a wireless network.

3. The method of claim 1, wherein there is no router in the local area network.

4. The method of claim 1, wherein the multimedia data stream comprises audio and video data.

5. The method of claim 1 further comprising the sending end re-sending the QoS packet using a TCP/IP protocol, when the at least one receiving end does not receive the QoS packet.

6. A local area network comprising:

a multimedia player;

at least one terminal;

a first network unit connected to the multimedia player for packaging a multimedia data stream into a multimedia data packet according to an RTP/UDP/IP protocol and for packaging a quality of service (QoS) signal into a QoS packet according to an RTCP/TCP/IP; and a second network unit connected to the terminal for receiving the QoS packet and the multimedia data packet from the first network unit, and forwarding the multimedia data packet to the terminal;

wherein the transmission quality between the multimedia player and the terminal is controlled by the QoS packet.

7. The local area network of claim 6 being a wireless network.

8. The local area network of claim 6, wherein the network unit is a wireless network unit.

9. The local area network of claim 6, wherein the multimedia player is an optical storage multimedia player.

10. The network of claim 6, wherein the terminal is a monitor.

11. The network of claim 6, wherein the first network unit and the second network unit transmits data to each other in a peer-to-peer manner.

* * * * *